United States Patent
Greenfield et al.

(10) Patent No.: US 11,307,579 B2
(45) Date of Patent: Apr. 19, 2022

(54) FAULT-TOLERANT CONTROL OF AN AUTONOMOUS VEHICLE WITH MULTIPLE CONTROL LANES

(71) Applicant: UATC, LLC, Mountain View, CA (US)

(72) Inventors: Aaron L. Greenfield, Pittsburgh, PA (US); Diana Yanakiev, Birmingham, MI (US); Frederic Tschanz, Pittsburgh, PA (US); Charles J. Tytler, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/322,231

(22) Filed: May 17, 2021

(65) Prior Publication Data

US 2021/0271240 A1 Sep. 2, 2021

Related U.S. Application Data

(63) Continuation of application No. 16/126,533, filed on Sep. 10, 2018, now Pat. No. 11,009,874.

(Continued)

(51) Int. Cl.
*G05D 1/00* (2006.01)
*B60W 50/029* (2012.01)
(Continued)

(52) U.S. Cl.
CPC ......... *G05D 1/0077* (2013.01); *B60W 50/023* (2013.01); *B60W 50/029* (2013.01);
(Continued)

(58) Field of Classification Search
CPC ........ G05D 1/0077; G05D 2201/0213; B60W 50/029; B60W 50/023; B60W 2050/0292;
(Continued)

(56) References Cited

U.S. PATENT DOCUMENTS

| | | |
|---|---|---|
| 9,195,232 B1 | 11/2015 | Egnor et al. |
| 2015/0012166 A1 | 1/2015 | Hauler et al. |

(Continued)

FOREIGN PATENT DOCUMENTS

| | | |
|---|---|---|
| DE | 102013020177 | 6/2014 |
| EP | 2466467 | 6/2012 |

(Continued)

OTHER PUBLICATIONS

International Search Report and Written Opinion for Application No. PCT/US2018/050542, dated Jan. 7, 2019, 13 pages.

*Primary Examiner* — Michael V Kerrigan
(74) *Attorney, Agent, or Firm* — Dority & Manning, P.A.

(57) ABSTRACT

In one example embodiment, a computer-implemented method includes receiving data representing a motion plan of the autonomous vehicle via a plurality of control lanes configured to implement the motion plan to control a motion of the autonomous vehicle, the plurality of control lanes including at least a first control lane and a second control lane, and controlling the first control lane to implement the motion plan. The method includes detecting one or more faults associated with implementation of the motion plan by the first control lane or the second control lane, or in generation of the motion plan, and in response to one or more faults, controlling the first control lane or the second control lane to adjust the motion of the autonomous vehicle based at least in part on one or more fault reaction parameters associated with the one or more faults.

20 Claims, 8 Drawing Sheets

Related U.S. Application Data

(60) Provisional application No. 62/558,523, filed on Sep. 14, 2017.

(51) Int. Cl.
*B60W 50/023* (2012.01)
*G06F 11/20* (2006.01)

(52) U.S. Cl.
CPC .......... *G06F 11/20* (2013.01); *G06F 11/2028* (2013.01); *B60W 2050/0292* (2013.01); *G05D 2201/0213* (2013.01)

(58) Field of Classification Search
CPC .. G06F 11/20; G06F 11/2028; G06F 11/2025; G06F 11/2041; G06F 2201/81; G06F 11/2038; B60Y 2302/05
See application file for complete search history.

(56) References Cited

U.S. PATENT DOCUMENTS

| | | |
|---|---|---|
| 2016/0009235 A1 | 1/2016 | Joyce et al. |
| 2016/0368491 A1 | 12/2016 | Hauler et al. |
| 2018/0162390 A1* | 6/2018 | Miura ................. G05D 1/0088 |

FOREIGN PATENT DOCUMENTS

| | | |
|---|---|---|
| EP | 2587330 | 5/2013 |
| EP | 3118703 | 1/2017 |
| WO | WO2017/084951 | 5/2017 |

* cited by examiner

FAULT-TOLERANT CONTROL OF AN AUTONOMOUS VEHICLE WITH MULTIPLE CONTROL LANES

PRIORITY CLAIM

The present application claims the benefit of priority of U.S. Provisional Patent Application No. 62/558,523, filed Sep. 14, 2017, and entitled "Systems and Methods for Controlling an Autonomous Vehicle with Multiple Control Lanes," and U.S. patent application Ser. No. 16/126,533, filed Sep. 10, 2018, and entitled "Fault-Tolerant Control of an Autonomous Vehicle with Multiple Control Lanes," the disclosure of both applications is incorporated by reference herein in its entirety.

FIELD

The present application relates generally to autonomous vehicles and, more particularly, the systems and methods for controlling an autonomous vehicle that has multiple control lanes.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment and command vehicle motion to track such motion plan.

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle. The method includes receiving data representing a motion plan of the autonomous vehicle and dynamic state of the autonomous vehicle via a plurality of control lanes configured to implement the motion plan to control a motion of the autonomous vehicle, the plurality of control lanes including at least a first control lane and a second control lane. The method includes controlling the first control lane to implement the motion plan. The method includes detecting one or more faults associated with implementation of the motion plan by the first control lane or the second control lane. The method includes controlling, in response to the one or more faults, the first control lane or the second control lane to adjust the motion of the autonomous vehicle based at least in part on one or more fault reaction parameters associated with the one or more faults.

Another example aspect of the present disclosure is directed to a computing system for controlling an autonomous vehicle. The computing system includes one or more processors and one or more tangible, non-transitory, computer readable media that collectively store instructions that when executed by the one or more processors cause the computing system to perform operations. The operations include determining a motion plan of the autonomous vehicle, the motion plan including one or more trajectories that cause the autonomous vehicle to travel from a first location to a second location when executed by the one or more processors. The operations include providing the motion plan to a plurality of control lanes configured to implement the motion plan to control a motion of the autonomous vehicle. The operations include detecting one or more faults associated with implementation of the motion plan by one or more of the plurality of control lanes. The operations include controlling one or more control lanes from the plurality of control lanes to adjust the motion of the autonomous vehicle based at least in part on one or more fault reaction parameters associated with the one or more faults, the one or more fault reaction parameters indicative of a capability of the one or more control lanes in response to the one or more faults.

Yet another example aspect of the present disclosure is directed to an autonomous vehicle. The autonomous vehicle includes an autonomous driving system, a vehicle control system, a plurality of vehicle actuation systems, one or more processors, and one or more tangible, non-transitory, computer readable media that collectively store instructions that when executed by the one or more processors cause the computing system to perform operations. The operations include generating, by the autonomous driving system, a motion plan of the autonomous vehicle, the motion plan including one or more trajectories that cause the autonomous vehicle to travel from a first location to a second location when executed by the one or more processors. The operations include receiving, by a plurality of control lanes of the vehicle control system, data representing the motion plan generated by the autonomous driving system, the plurality of control lanes configured to track the one or more trajectories to control a motion of the autonomous vehicle in accordance with the motion plan, each of the plurality of control lanes are connected to one or more vehicle actuation systems from the plurality of vehicle actuation systems. The operations include providing, by the vehicle control system via a control lane from the plurality of control lanes, one or more vehicle control signals to the one or more vehicle actuation systems connected to the control lane, to control the motion of the autonomous vehicle in accordance with the motion plan. The operations include detecting, by the vehicle control system, one or more faults associated with implementation of the motion plan by one or more of the plurality of control lanes. The operations include controlling, by the vehicle control system, one or more of the plurality of control lanes to adjust the motion of the autonomous vehicle based on one or more fault reaction parameters associated with the one or more faults.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

Figure 1:
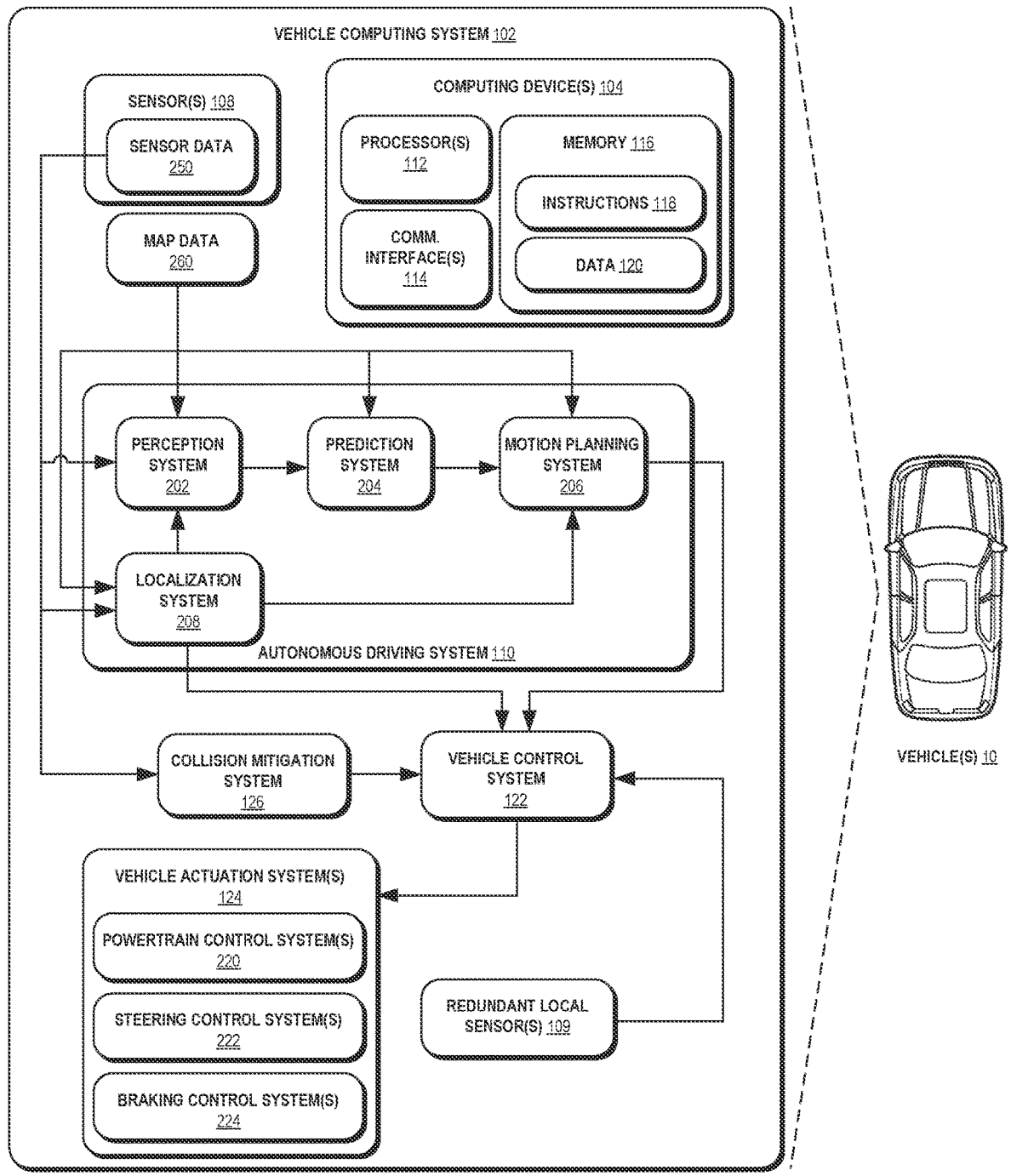
FIG. 1 depicts an example system overview according to example embodiments of the present disclosure.

Reference numerals that are repeated across plural figures are intended to identify the same components or features in various implementations.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling an autonomous vehicle with multiple control lanes. An autonomous vehicle can autonomously navigate through a surrounding environment by executing one or more planned trajectories in a motion plan that cause the autonomous vehicle to travel along a vehicle route. An autonomous driving system onboard the autonomous vehicle can generate the motion plan and provide the motion plan to a vehicle control system. The vehicle control system can generate one or more vehicle control signals based on the motion plan to track the one or more planned trajectories, and provide the vehicle control signals to one or more vehicle actuation systems that can control the autonomous vehicle.

The autonomous vehicle can detect a fault with respect to its operation, and in particular an operation of the autonomous driving system, vehicle control system, and/or vehicle actuation system(s). However, in a single-lane control architecture even if the autonomous vehicle can detect a fault, the autonomous vehicle can be unable to effectively handle the fault. For example, if an autonomous vehicle detects a fault associated with a braking control system causing a loss of braking control when the autonomous vehicle is traveling at high speed, then the autonomous vehicle can be unable to effectively slow down. The autonomous vehicle could downshift to slow down, but this may not be the most "effective" solution. Furthermore, if the autonomous vehicle detects a fault associated with a transmission system, then downshifting may not be an available solution. The present disclosure can enable an autonomous vehicle with a multi-lane control architecture and methods for controlling the same. The multi-lane control architecture can allow for fault-tolerant control of the autonomous vehicle. Fault-tolerant control means that the autonomous vehicle can be tolerant of any single point of failure and is always able to be controlled to a safe state. This means if a fault occurs in a currently active set of localization, perception, planning, control, and actuation systems, then the autonomous vehicle can use a redundant or alternate control system that can control the autonomous vehicle to a safe state. This also means that if a fault occurs in one of the active, redundant, or alternate control systems, then the autonomous vehicle is no longer robust to a single point of failure and the autonomous vehicle can be controlled to a safe state to avoid exposure to any potential single points of failure.

By using two or more control lanes of the multi-lane control architecture, the autonomous vehicle can be controlled to effectively handle a fault associated with one or more operations of the autonomous vehicle, such as the implementation of the motion plan. For example, the multi-lane control architecture can include a first braking control system connected to a first control lane, and a second braking control system connected to a second control lane. If the autonomous vehicle detects a fault associated with a loss of braking control (e.g., a failure of the first control lane or the first braking control system), then the autonomous vehicle can switch to the second control lane to maintain braking control (e.g., via the second control lane and the second braking control system). In this way, in the event of one or more faults associated with one or more operations of the autonomous vehicle (e.g., autonomous navigation, propulsion, steering, braking, etc.), the autonomous vehicle can continue to operate by switching to a different control lane. Additionally, by introducing a level of redundancy with regard to the one or more operations, the multi-lane control architecture can improve the safety and reliability of the autonomous vehicle.

More particularly, an autonomous vehicle can include a vehicle computing system that implements a variety of systems on-board the autonomous vehicle (e.g., located on or within the autonomous vehicle) for autonomous navigation. For instance, the vehicle computing system can include an autonomous driving system (e.g., for planning and executing autonomous navigation), a plurality of vehicle actuation systems (e.g., vehicle-specific systems responsible for powertrain, steering, braking, etc.), and a vehicle control system (e.g., for interfacing between the autonomous driving system and vehicle-specific vehicle actuation systems). In some implementations, the vehicle computing system can include a collision mitigation system (e.g., for detecting and mitigating potential collisions).

The autonomous driving system of the autonomous vehicle can include one or more autonomy system(s) for planning and executing autonomous navigation. For instance, an autonomous driving system can include, among other systems, a localization system, a perception system, a prediction system, and a motion planning system that cooperate to perceive a surrounding environment of an autonomous vehicle and determine a motion plan for controlling a motion of the autonomous vehicle. The motion plan can include one or more trajectories (e.g., trajectory information) that cause the autonomous vehicle to travel from a starting location of a vehicle route to an ending location of the vehicle route when executed. In some implementations, the trajectory information can include requirements on speed, time of arrival, or other components of the vehicle's dynamic state associated with the vehicle route. In some implementations, the motion plan can include one or more primary trajectories that each correspond to a segment of the vehicle route and cause the autonomous vehicle to travel from the starting location to the ending location of the vehicle route when executed in sequence. Each of the one or more primary trajectories can cause the autonomous vehicle to travel from a starting location of the primary trajectory (e.g., starting location of the corresponding vehicle route segment) to an ending location of the primary trajectory (e.g., ending location of the corresponding vehicle route segment) when executed. In some implementations, the motion plan can include a safe-stop trajectory associated with each primary trajectory that cause the autonomous vehicle to travel from a starting location of the primary trajectory to a safe-stop location (e.g., nearest location where the autonomous vehicle can safely come to a stop) when executed. The autonomous driving system can continuously update the motion plan and provide the updated motion plan to the vehicle control system. For example, the autonomous driving system can update the motion plan based on the surrounding environment of the autonomous vehicle (e.g., one or more objects in the surrounding environment) and a dynamic state of the autonomous vehicle within the environment.

The vehicle control system of the autonomous vehicle can receive data representing a motion plan from the autonomous driving system and implement the motion plan via a multi-lane control architecture. For instance, the vehicle control system can receive the data representing the motion plan via a plurality of control lanes. Each of the control lanes can be configured to independently implement the motion plan by generating one or more vehicle control signals to track a trajectory in the motion plan. The vehicle control system can control one or more control lanes from the plurality of control lanes to provide the vehicle control signal(s) to one or more vehicle actuation systems associated with the control lane to control the autonomous vehicle in accordance with the motion plan. The vehicle control system can silence one or more remaining control lanes from the plurality of control lanes by controlling the remaining control lane(s) to assume a "fail silent" mode that prevents the remaining control lane(s) from providing the vehicle control signal(s) to one or more vehicle actuation systems associated with the control lane. In this way, the vehicle control system can preclude multiple control lanes from attempting to simultaneously control a single operation of the autonomous vehicle (e.g., propulsion, steering, braking, etc.).

In some implementations, each control lane of vehicle control system can be connected to a set of vehicle actuation systems to control the autonomous vehicle independently of each other. For example, a first control lane can be associated with a first set of vehicle actuation systems (e.g., systems responsible for powertrain, steering, braking, etc.) and a second control lane can be associated with a second set of vehicle actuation systems (e.g., systems responsible for powertrain, steering, braking, etc.). The vehicle control system can control the first control lane to implement the motion plan and provide vehicle control signal(s) to the first set of vehicle actuation systems to control the vehicle. If the vehicle control system detects a fault associated with implementing the motion plan via the first control lane, then the vehicle control system can silence the first control lane and control the second control lane to implement the motion plan.

In some implementations, each control lane of the vehicle control system can be connected to a different set of vehicle actuation systems to control the autonomous vehicle. For example, a first control lane can be associated with a first set of vehicle actuation systems that includes a powertrain control system, and a second control lane can be associated with a second set of vehicle actuation systems that does not include a powertrain control system. In this example, the vehicle control system can determine that the first control lane has a greater capability of controlling the autonomous vehicle (because the first control lane can control a propulsion of the autonomous vehicle and the second control lane cannot) and the vehicle control system can control the first control lane to implement the motion plan. If the vehicle control system detects a fault associated with implementing the motion plan via the first control lane, then the vehicle control system can silence the first control lane and control the second control lane to implement the motion plan. The vehicle control system can determine that the second control lane has a reduced capability of controlling the autonomous vehicle (e.g., because the second set of vehicle actuation systems does not include a powertrain control system) and adjust the motion plan of the autonomous vehicle accordingly. For example, the vehicle control system can request the autonomous driving system to provide a new motion plan for safely stopping the autonomous vehicle (e.g., assisted safe-stop action) and implement the new motion plan. Alternatively, the vehicle control system can retrieve a locally stored safe-stop trajectory that was previously received, and track the local safe-stop trajectory.

The vehicle actuation systems of the autonomous vehicle can include one or more systems for controlling the autonomous vehicle. For instance, the vehicle actuation systems can include a powertrain control system, steering control system, braking control system, etc., to control a motion of the autonomous vehicle. The vehicle actuation systems can also include various other systems to control different operations of the autonomous vehicle, such as, for example, a climate control system, stereo control system, seat control system, internal/external indicator control system, etc. The vehicle actuation systems can receive one or more vehicle control signals from a control lane of the vehicle control system, and control the autonomous vehicle in accordance with the vehicle control signals. For example, the powertrain control system can control a propulsion of the autonomous vehicle, the steering control system can control a steering of the autonomous vehicle, the braking control system can control a braking of the autonomous vehicle, etc. In some implementations, the vehicle actuation systems can generate one or more actuator commands (e.g., at least one lateral vehicle actuator command and at least one longitudinal vehicle actuator command) and control one or more vehicle actuators in accordance with the vehicle control signals. Vehicle actuators can include, for example, a steering actuator, a braking actuator, and/or a propulsion actuator. In some implementations, the vehicle actuators can include further low-level control logic. For example, additional low-level control logic may be beneficial to control a steering motor to keep the steering rack at a desired position as commanded by the vehicle actuation system in case the vehicle actuation system does not directly control the steering motor.

In some implementations, the vehicle actuation systems can include two or more identical sets of vehicle actuation systems. Each set of vehicle actuation systems can be connected to a control lane of the vehicle control system. For instance, a first set of vehicle actuation systems can include a first powertrain control system, first steering control system, first braking control system, etc., and a second set of vehicle actuation systems can include a second powertrain control system, second steering control system, second braking control system, etc. The first set of vehicle actuation systems can be connected to a first control lane of the vehicle control system, and the second set of vehicle actuation systems can be connected to a second control lane of the vehicle control system.

In some implementations, the vehicle actuation systems can include two or more different sets of vehicle actuation systems such that a first set of vehicle actuation systems contains a different number of and/or combination of types of control systems than a second set of vehicle actuation systems. Each set of vehicle actuation systems can be connected to a control lane of the vehicle control system. For instance, a first set of vehicle actuation systems can include a powertrain control system, first steering control system, first braking control system, etc., and a second set of vehicle actuation systems can include a second steering control system, second braking control system, etc., but not a second powertrain control system. The first set of vehicle actuation systems can be connected to a first control lane of the vehicle control system, and the second set of vehicle actuation systems can be connected to a second control lane of the vehicle control system.

In some implementations, the vehicle actuation systems can include independent control systems which can be connected to the same control lane of the vehicle control system. For instance, a first control lane can be connected to a first braking control system and a second braking control system, and a second control lane can be connected to the first braking control system and/or the second braking control system.

Fault Detection

According to aspects of the present disclosure, the vehicle computing system can detect one or more faults associated with one or more operations of the autonomous vehicle (e.g., determining a motion plan, implementing a motion plan, etc.). In particular, the one or more faults can be associated with one or more of the various systems implemented by the vehicle computing system on-board the autonomous vehicle (e.g., autonomy computing system, vehicle control system, vehicle actuation system, etc.).

In some implementations, the one or more various systems on-board the autonomous vehicle can each detect one or more faults associated with itself, and notify one or more other systems about the detected fault(s). As an example, the autonomous driving system or one of the vehicle actuation systems can detect one or more faults associated with it and provide one or more diagnostic signals to the vehicle control system to notify the vehicle control system about the detected fault(s). As another example, each control lane of the vehicle control system can detect one or more faults associated with it and notify the vehicle control system about the detected fault(s).

In some implementations, the one or more various systems on-board the autonomous vehicle can detect one or more faults associated with each other. As an example, if the vehicle control system fails to receive a motion plan (or updated motion plan) from the autonomous driving system within a predetermined time frame, or if the vehicle control system receives a motion plan that fails a cyclic redundancy check (CRC), then the vehicle control system can determine that the autonomous driving system has experienced a fault. As another example, if the vehicle control system fails to receive a handshake or acknowledgement signal from a vehicle actuation system within a predetermined time frame, then the vehicle control system can determine that the vehicle actuation system has experienced a fault. As another example, if the vehicle control system fails to detect a heartbeat signal from a control lane, then the vehicle control system can determine that the second control lane has experienced a fault. In this way, the vehicle computing system (e.g., one or more of the various systems implemented by the vehicle computing system) can detect a plurality of different fault types associated with the vehicle computing system. The plurality of different fault types can include, for example, a plausibility fault, communication fault, environmental operational limit fault, range or tolerance exceedance fault, hardware failure fault, software error fault, handshake or acknowledgement fault, calibration or ready status fault, or external reported fault.

A plausibility fault can be detected when the vehicle computing system determines that one or more signals exceed reasonable values based on known characteristics or past values of the signal(s). The vehicle computing system can determine that the signal(s) are implausible and flag the signal(s) and/or the corresponding system(s) as faulty. The known characteristics can include vehicle dynamic constraints, expected covariance/residual values, statistical properties, or interdependency between the signals. Extreme changes or inconsistencies in the signal(s) can be identified as implausible outright or when compared against a reference.

A communication fault can be detected when the vehicle computing system receives one or more signals over a communication channel. Signals that are received over a communication channel can have multiple sources of error. As an example, corruption of the signal(s) can be detected by end to end protection methods such as a cyclic redundancy check (CRC) or other checksum algorithm. As another example, a timing of the signal(s) reception can be delayed such that the signal(s) is no longer accurate. A timestamp associated with the signal(s) that indicates the signal content is aged (e.g., older than 50 ms) can indicate a fault. As another example, a timeout where no message is received at all after a certain amount of time from when the message is expected can indicate a fault. As another example, a sequence of messages received can indicate a fault if the order is not as expected, some content is missing, and/or the received content is mismatched.

An environmental operational limit fault can be detected when the vehicle computing system determines that it is operating outside of its intended operational limits, such as in extreme temperature, humidity, or weather conditions affecting driving surface conditions or visibility.

A range or tolerance exceedance fault can be detected when the vehicle computing system determines that one or more monitored signals or parameters have drifted or acquired unacceptable values for functional safety, based on an associated required range or tolerance.

A hardware failure fault can be detected when the vehicle computing system monitors a heartbeat or power signal of safety critical hardware components and identifies electrical shorts or disconnects, or unusual readings from the hardware component.

A software error fault can be detected when the vehicle computing system is monitoring a software component and identifies an error or unacceptable value/state. The vehicle computing system can monitor the software component via another software component that can have additional reference inputs, run on a different software layer or CPU core, or be designed and validated to a higher integrity level.

A handshake or acknowledgement fault can be detected when the vehicle computing system expects some form of a handshake or acknowledgement from a separate hardware or software component before continuing, and the vehicle computing system does not receive the handshake or acknowledgment.

A calibration or ready status fault can be detected when a calibration or some other event causes the vehicle computing system to change the ready status of a system/component to false during autonomous operation.

An external reported fault can be detected when the vehicle computing system receives an indication (e.g., diagnostic signals, flag state) from a system/component notifying the vehicle computing system of a fault associated with the system/component. In some implementations, the indication of the fault can provide levels of accuracy or quality of a signal, or express a degraded capability of the system/component.

Fault Management

According to aspects of the present disclosure, the vehicle control system can adjust a motion of the autonomous vehicle in response to detecting one or more faults associated with one or more operations of the autonomous vehicle (e.g., determining a motion plan, implementing a motion plan, etc.). During operation, the vehicle control system can receive data representing a motion plan and data representing a dynamic state of the autonomous vehicle from the autonomous driving system. The dynamic state can generally describe the position and/or orientation and/or their rates of change (e.g. velocity, acceleration, jerk, angular velocity, angular acceleration) of the vehicle in the surrounding environment. The position component of vehicle dynamic state can generally describe where the vehicle is located and the orientation component can generally describe how the vehicle is oriented with respect to the surrounding environment and trajectory. In some implementations, the dynamic state can include further derivatives of the position and/or orientation of the vehicle with respect to the surrounding environment of the vehicle and trajectory. The vehicle control system can control one or more control lanes to implement the motion plan. The one or more control lanes can continuously receive data representing the dynamic state of the autonomous vehicle to understand where the autonomous vehicle is located in relation to the motion plan. The handling of these two inputs (e.g., data representing the motion plan and data representing the dynamic state) allow the control lane to implement feedback control and correct its commands to the vehicle actuator system(s) if the received dynamic state deviates from the planned trajectory. The vehicle control system can control one or more control lanes to implement the motion plan. In particular, the vehicle control system can determine a capability associated with each of the plurality of control lanes and determine a hierarchy for the plurality of control lanes in order of decreasing capability. For example, the vehicle interface system can determine the capability of a control lane based on one or more faults associated with the control lane, one or more vehicle actuation systems associated with the control lane if one or more control lanes are associated with different sets of vehicle actuation systems, and/or one or more faults associated with the one or more vehicle actuation systems associated with the control lane.

The vehicle control system can select a first control lane that is associated with the highest capability. The vehicle control system can silence the one or more other control lanes (e.g., control the one or more other control lanes to assume a "fail silent" mode). The vehicle control system can control each control lane to determine a primary trajectory based on the motion plan, and control the first control lane to track the primary trajectory. The vehicle control system can also control each control lane to determine a safe-stop trajectory based on the motion plan and store the safe-stop trajectory in local memory. In some implementations, if the first control lane is associated with a degraded capability, then the vehicle control system can select one or more second control lanes, and control the second control lane(s) to track the primary trajectory.

In some implementations, the vehicle control system can detect a fault associated with the autonomous driving system (e.g., a fault associated with receiving data representing a motion plan from the autonomous driving system). For example, the vehicle control system can receive one or more diagnostic signal(s) from the autonomous driving system indicative of the fault (e.g., external reported fault), and/or the vehicle control system can detect the fault based on one or more signals or data received from the autonomous driving system (e.g., plausibility fault, communication fault, calibration or ready status fault, etc.). In response, the vehicle control system can retrieve the latest locally stored safe-stop trajectory received from the autonomous driving system, and control the first control lane to track the local safe-stop trajectory. In this way, the vehicle control system can adjust a motion of the autonomous vehicle to come to a safe stop. When the vehicle control system is controlling the first control lane to track the local safe-stop trajectory, if the vehicle control system continues to receive valid data representing the dynamic state of the autonomous vehicle from the autonomous driving system, then the vehicle control system can control the first control lane to track the local safe-stop trajectory based on data received from the autonomous driving system that includes the valid dynamic state information. Alternatively, the vehicle control system can determine a dynamic state of the autonomous vehicle based on an inertial measurement unit (IMU) associated with the first control lane, and/or one or more redundant local sensors onboard the autonomous vehicle. The one or more redundant local sensors can include, for example, an odometer that can provide measured odometry data, a steering angle sensor that can provide measured steering angle data, a torque sensor that can provide measured torque data, etc. The vehicle control system can control the first control lane to track the local safe-stop trajectory based on the determined dynamic state of the autonomous vehicle. In addition, if the vehicle control system receives data indicative of a potential collision (e.g., from the collision mitigation system), then the vehicle control system can control the first control lane to adjust the local safe-stop trajectory based on the data indicative of the potential collision in order to avoid the potential collision.

In some implementations, the vehicle control system can detect a fault associated with one or more of the plurality of control lanes. For example, the vehicle control system can detect a fault associated with the first control lane (e.g., environmental operational limit fault, hardware failure fault, etc.). In response, the vehicle control system can update a capability of the first control lane based on the detected fault. If the updated capability of the first control lane is greater than a capability of a second control lane of the vehicle control system, then the vehicle control system can control the first control lane to continue tracking a trajectory of a motion plan. If the updated capability of the first control lane is less than a capability of a second control lane of the vehicle control system, then the vehicle control system can silence the first control lane, and control the second control lane to track the trajectory of the motion plan. If the vehicle control system determines that the updated capability of the first control lane or the capability of the second control lane is degraded with respect to the original capability of the first control lane, then the vehicle actuation system can control the first control lane or the second control lane to adjust a motion of the autonomous vehicle based on the degraded capability.

As another example, the vehicle control system can detect a fault associated with the second control lane (e.g., environmental operational limit fault, hardware failure fault, etc.). In response, the vehicle control system can update a capability of the second control lane based on the detected fault. If the updated capability of the second control lane indicates a loss of redundancy with respect to a critical operation/system of the autonomous vehicle (e.g., a loss of redundancy with respect to propulsion, steering, braking, etc.), then the vehicle control system can control the first control lane to adjust a motion of the autonomous vehicle based on the degraded capability of the second control lane. In particular, the vehicle control system can control the first control lane to provide one or more control signals to the autonomous driving system to request a new motion plan for an assisted safe-stop action. If the vehicle control system receives data representing the new motion plan, then the vehicle control system can control the first control lane to implement the assisted safe-stop action. If the vehicle control system detects a fault associated with receiving the new motion plan, then the vehicle control system can control the first control lane to retrieve the latest locally stored safe-stop trajectory and control the first control lane to track the local safe-stop trajectory.

In some implementations, the vehicle control system can detect a fault associated with one or more vehicle actuation systems. For example, the vehicle control system can detect a fault (e.g., external reported fault, etc.) associated with a powertrain control system connected to the first control lane. In response, the vehicle control system can update a capability of the first control lane based on the detected fault, and select a control lane based on an updated capability hierarchy of the plurality of control lanes. If the selected control lane has a degraded capability with respect to the original capability of the first control lane, then the vehicle actuation system can adjust a motion of the autonomous vehicle based on the degraded capability. In particular, the vehicle control system can determine that the powertrain control system is a critical system, and if the capability of the selected control lane does not include propulsion control of the autonomous vehicle, then the vehicle control system can control the selected control lane to provide one or more control signals to the autonomous driving system to request a new motion plan for an assisted safe-stop action. In some implementations, the request can include data indicative of the degraded capability, and the autonomous driving system can determine the new motion plan based on the degraded capability (e.g., determine the new motion plan such that the new motion plan can be implemented without propulsion control of the autonomous vehicle). If the vehicle control system receives data representing the new motion plan, then the vehicle control system can control the selected control lane to implement the assisted safe-stop action. If the vehicle control system detects a fault associated with receiving the new motion plan, then the vehicle control system can control the selected control lane to retrieve the latest locally stored safe-stop trajectory and track the local safe-stop trajectory.

As another example, the vehicle control system can detect a fault associated with a non-critical operation of the autonomous vehicle (e.g., seat control system, stereo control system, etc.). In response, the vehicle control system can update a capability of the first control lane based on the detected fault, and select a control lane based on an updated capability hierarchy of the plurality of control lanes. The vehicle control system can determine that the fault is associated with a non-critical operation, and the vehicle control system can control the selected control lane to continue implementing the motion plan even if the selected control lane has a degraded capability with respect to the original capability of the first control lane with respect to the non-critical operation.

The systems and methods described herein provide a number of technical effects and benefits. Systems and methods for controlling an autonomous vehicle with multiple control lanes for controlling a first operation of the autonomous vehicle can have a technical effect of improving safety and reliability. By enabling an autonomous vehicle, or another computing system, with multiple control lanes, the autonomous vehicle can effectively respond to a detected fault by adjusting a motion of the autonomous vehicle (e.g., implement an assisted safe-stop action, track a local safe-stop trajectory, etc.). This can allow an autonomous vehicle to complete a vehicle service if a detected fault is a non-critical fault, or to come to a safe-stop if the detected fault is a critical fault, thus affording safe and customizable performance options.

The systems and methods of the present disclosure that include multiple control lanes can also generally provide system-level redundancy in case of component failure in the autonomous vehicle. More particularly, utilizing a primary control lane and one or more secondary control lanes that each process independently of one another can enable a vehicle control system to determine which specific control lane can be configured to control various vehicle actuation systems of the autonomous vehicle. Such determination can also be dynamically tailored to the current operating conditions (e.g., current motion of the autonomous vehicle, type(s) of faults detected, etc.). In this way, vehicle and passenger safety can be enhanced as appropriate if an unexpected fault is encountered.

The systems and methods of the present disclosure also provide an improvement to vehicle computing technology, such as autonomous vehicle computing technology. For instance, the systems and methods herein enable the vehicle technology to include a multi-lane control architecture, and to control the same. For example, the systems and methods can allow one or more computing system(s) on-board an autonomous vehicle (and/or off-board a vehicle) to control a first operation of the autonomous vehicle via multiple control lanes to effectively respond to a detected fault with respect to a primary control lane. This allows the autonomous vehicle to more safely and reliably perform autonomous navigation.

Example Embodiments

With reference now to the FIGS., example embodiments of the present disclosure will be discussed in further detail.

FIG. 1 depicts an example computing system according to example embodiments of the present disclosure. The computing system 100 illustrated in FIG. 1 is provided as an example only. The components, systems, connections, and/or other aspects illustrated in FIG. 1 are optional and are provided as examples of what is possible, but not required, to implement the present disclosure. The computing system 100 can include one or more vehicles 10. Vehicle 10 can be a ground-based autonomous vehicle (e.g., car, truck, bus), an air-based autonomous vehicle (e.g., airplane, drone, helicopter, or other aircraft), or other types of vehicles (e.g., boat, ship, or other watercraft). Vehicle 10 can be an autonomous vehicle that can drive, navigate, operate, etc. with minimal and/or no interaction from a human driver, or vehicle 10 can be manually controlled by a human operator. Vehicle 10 can be associated with a vehicle computing system 102.

Vehicle 10 can be capable of sensing its environment, navigating its environment with minimal or no human input, and/or the like. Vehicle 10 can include a vehicle computing system 102. Vehicle computing system 102 can assist in controlling vehicle 10. For example, vehicle computing system 102 can receive data generated by one or more sensors 108, attempt to comprehend an environment surrounding vehicle 10 by performing various processing techniques on the data generated by sensor(s) 108, generate, determine, select, and/or the like a motion plan for navigating vehicle 10 through, within, and/or the like such surrounding environment, and/or the like. Vehicle computing system 102 can interface with one or more vehicle controls to operate vehicle 10 (e.g., in accordance with the motion plan, and/or the like).

Vehicle computing system 102 can include one or more computing devices 10 and various systems on-board the vehicle 10 (e.g., autonomous driving system 110, vehicle control system 122, vehicle actuation system(s) 124, and collision mitigation system 126). Computing device(s) 10 can include circuitry configured to perform one or more operations, functions, and/or the like described herein. For example, computing device(s) 10 can include one or more processor(s) 112, one or more communication interfaces 114, and memory 116 (e.g., one or more hardware components for storing executable instructions, data, and/or the like). Communication interface(s) 114 can enable computing device(s) 10, autonomous driving system 110, vehicle control system 122, vehicle actuation system(s) 124, and collision mitigation system 126 to communicate with one another, and/or can enable vehicle 10 (e.g., computing system 102) to communicate with one or more computing systems, computing devices, and/or the like distinct from vehicle 10. Memory 116 can include (e.g., store, and/or the like) instructions 118 and data 120. When executed by processor(s) 112, instructions 118 can cause vehicle 10 (e.g., vehicle computing system 102) to perform one or more operations, functions, and/or the like described herein. Data 120 can include, represent, and/or the like information associated with such operations, functions, and/or the like, and data generated by sensor(s) 108, and/or the like.

Sensor(s) 108 can include, for example, one or more cameras (e.g., visible spectrum cameras, infrared cameras, and/or the like), light detection and ranging (LIDAR) systems, radio detection and ranging (RADAR) systems, and/or the like. Sensor(s) 108 can generate sensor data 250 that is descriptive of the environment proximate to the sensor(s), including information that describes one or more locations, velocities, vectors, and/or the like of objects in the environment surrounding vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Autonomous driving system 110 can include perception system 202, prediction system 204, motion planning system 206, and localization system 208. Perception system 202 can retrieve, obtain, and/or the like map data 260, which can provide information about an environment surrounding vehicle 10. For example, map data 260 can provide information regarding: the identity and location of different travel ways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist vehicle computing system 102 in comprehending, perceiving, and/or the like an environment surrounding vehicle 10, its relationship thereto, and/or the like.

Perception system 202 can (e.g., based at least in part on sensor data 250, map data 260, and/or the like) identify one or more objects proximate to vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, and/or the like); current location (also referred to as position); speed (also referred to as velocity); acceleration; heading; orientation; yaw rate; and/or the like. In some embodiments, perception system 202 can determine such state data for each object over a number of iterations, for example, updating, as part of each iteration, the state data for each object. Accordingly, perception system 202 can detect, track, and/or the like such object(s) over time.

Prediction system 204 can receive state data from perception system 202 and can predict (e.g., based at least in part on such state data, and/or the like) one or more future locations for each object. For example, prediction system 204 can predict where each object will be located within the next five seconds, ten seconds, twenty seconds, and/or the like. As one example, an object can be predicted to adhere to its current trajectory according to its current speed.

Additionally or alternatively, other prediction techniques, modeling, and/or the like can be used.

Motion-planning system 206 can generate, determine, select, and/or the like a motion plan for vehicle 10, for example, based at least in part on state data of object(s) provided by perception system 202, predicted future location(s) of object(s) provided by prediction system 204, and/or the like. For example, utilizing information about current location(s) of object(s), predicted future location(s) of object(s), and/or the like, motion-planning system 206 can generate, determine, select, and/or the like a motion plan for vehicle 10 that it determines (e.g., based at least in part on one or more operation parameters, and/or the like) best navigates vehicle 10 relative to the object(s).

Motion-planning system 206 can provide the motion plan to vehicle control system 122, which can directly and/or indirectly control vehicle 10 via the one or more vehicle actuation system(s) 124 in accordance with the motion plan. The vehicle control system 122 can generate vehicle control signals to track a trajectory in the motion plan and provide the vehicle control signals to the vehicle actuation system(s) 124 (e.g., powertrain control system(s) 220, steering control system(s) 222, braking control system(s) 224, etc.). The vehicle actuation system(s) 124 can control vehicle 10 via one or more actuators, devices, and/or the like that control gas, power flow, steering, braking, and/or the like in accordance with the vehicle control signals.

Localization system 208 can be any device or circuitry for analyzing the position of the vehicle 10. The localization system 208 can determine a dynamic state of the vehicle based on one or more localization techniques. In some implementations, the localization system 208 can determine a position of the vehicle 10 within the surrounding environment (e.g., across six axes) based at least in part on the sensor data 145. In some implementations, the localization system 208 can determine the position of the vehicle 10 based on the sensor data 145 and map data 260. In some implementations, the localization system 208 can determine a position of the vehicle 10 with only three degrees of freedom consisting of a two-dimensional translation and a heading angle. The localization system 208 can provide data indicative of the location of the autonomous vehicle to one or more of the various autonomy systems of the autonomous driving system 110 (e.g., perception system 202, prediction system 204, motion planning system 206, etc.) and to the vehicle control system 122. For example, the motion planning system 206 can determine a motion plan for the autonomous vehicle based at least in part on the location of the autonomous vehicle within the surrounding environment. As another example, the vehicle control system 122 can use the data representing the dynamic state of the autonomous vehicle when implementing a motion plan in order to adjust vehicle control signals to the vehicle 10 to account for errors in tracking and disturbances from the surrounding environment of the vehicle 10 (e.g., uneven roads, potholes, objects, etc.).

Collision mitigation system 126 can monitor a surrounding environment of the vehicle 10 using sensor data 250 generated by sensor(s) 108 to detect a potential collision between the vehicle 10 and an object in the surrounding environment. When a potential collision is detected, the collision mitigation system 126 can provide data indicative of the potential collision to the vehicle control system 122, so that the vehicle control system 122 can adjust a motion of the vehicle 10 to avoid the potential collision (e.g., when the autonomous driving system 110 is unable to provide a motion plan to the vehicle control system 122).

Autonomous driving system 110 (e.g., perception system 202, prediction system 204, motion-planning system 206), vehicle control system 122, vehicle actuation system(s) 124, and/or collision mitigation system 126 can include logic utilized to provide functionality described herein. Autonomous driving system 110 (e.g., perception system 202, prediction system 204, localization system 208, motion-planning system 206), vehicle control system 122, vehicle actuation system(s) 124, and/or collision mitigation system 126 can be implemented in hardware (e.g., circuitry, and/or the like), firmware, software configured to control one or more processors, one or more combinations thereof, and/or the like. For example, instructions 118, when executed by processor(s) 112, can cause vehicle 10 (e.g., vehicle computing system 102) to implement functionality of autonomous driving system 110 (e.g., perception system 202, prediction system 204, localization system 208, motion-planning system 206), vehicle control system 122, vehicle actuation system(s) 124, and/or collision mitigation system 126 as described herein.

In some implementations, vehicle 10 can include one or more redundant local sensors 109. The redundant local sensor(s) 109 can include, for example, an odometer that can provide measured odometry data, a steering angle sensor that can provide measured steering angle data, a torque sensor that can provide measured torque data, etc. The redundant local sensor(s) 109 can provide the measured sensor data to one or more control lanes of the vehicle control system 122, and the one or more control lanes of the vehicle control system 122 can use the measured sensor data to determine a dynamic state of the vehicle 10 (e.g., if there is a fault associated with the localization system 208). In some implementations, the redundant local sensor(s) 109 are independent of the sensor(s) 108, so that the vehicle control system 122 can determine a dynamic state of the vehicle 10 if there is a fault associated with sensor(s) 108. In some implementations, the redundant local sensor(s) are locally embedded within the vehicle control system 122.

In some implementations, the vehicle control system 122 can arbitrate between data received from the autonomous driving system 110 and data received from the collision mitigation system 126, if the vehicle control system 122 determines that the received data conflicts and there is a discrepancy between how to control the vehicle. The vehicle control system 122 can determine which action is more conservative and implement the more conservative action. For example, if the data received from the autonomous driving system 110 indicates that the vehicle control system 122 should control the vehicle 10 to implement a soft braking action, but the data received from the collision mitigation system 126 indicates that the vehicle control system 122 should control the vehicle 10 to implement a hard braking action, then the vehicle control system 122 can determine to implement the hard braking action (even if there is no fault detected or associated with the autonomous driving system 110).

In some implementations, data 120 can include fault reaction parameters data that describes an action in response to a specific combination of faults detected by the vehicle computing system 102. For example, the fault reaction parameters data can indicate that a fault corresponding to braking control system(s) 224 of the vehicle 10 is a critical fault, and that a fault corresponding to an audio control system of the vehicle 10 is not a critical fault.

As another example, if the vehicle control system 122 includes a dual-lane control architecture, then the fault reaction parameters data can indicate that a first fault causing a loss of control of braking control system(s) 224 via a first control lane is critical because a second fault with respect to braking control system(s) 224 would cause the vehicle control system 122 to be unable to control braking of vehicle 10.

As yet another example, if vehicle control system 122 includes a three-lane control architecture, then the fault reaction parameters data can indicate that a first fault causing a loss of control of braking control system(s) 224 via a first control lane is not critical, and a second fault with respect to braking control system(s) 224 via a second control lane is critical because a third fault with respect to braking control system(s) 224 via a third control lane would cause the vehicle computing system 102 to be unable to control a motion of vehicle 10. In the case of the three-lane control architecture, in response to the vehicle computing system 102 detecting the first fault corresponding to the first control lane, the fault reaction parameters data can describe an action of using the second control lane to control the vehicle 10 and complete a vehicle service; and in response to the vehicle computing system 102 detecting the second fault corresponding to the second control lane, the fault reaction parameters data can describe an action of using the third control lane to control the vehicle 10 and implement an assisted safe-stop action.

In some implementations, the fault reaction parameters data can include a redundancy threshold value for one or more operations of vehicle 10. The redundancy threshold can be an integer value equal to or greater than −1, and indicate a redundancy level for each of the operations.

A redundancy threshold value of −1 for an operation can indicate a non-critical operation that does not require any redundancy. In the event of a fault with respect to an operation with a redundancy threshold value of −1, the vehicle computing system 102 can implement a motion plan (to complete a vehicle service) without control of the operation, and the vehicle computing system 102 can determine that the fault is not a critical fault.

A redundancy threshold value of 0 (zero) for an operation can indicate a critical operation. The vehicle computing system 102 can determine that any fault with respect to an operation with a redundancy threshold value of 0 (zero) is a critical fault.

A redundancy threshold value of 1 or greater for an operation can indicate that the vehicle computing system 102 should withstand, at any given time, a number of faults equal to the threshold value with respect to the operation, while maintaining control of the operation.

For example, the fault reaction parameters data can include a redundancy threshold value of 1 for a braking operation of vehicle 10 with a dual-lane control architecture. In the dual-lane control architecture, braking control system(s) 224 can be controlled via a first control lane or a second control lane. If a fault with respect to braking control system(s) 224 via one of the control lanes were to occur, then the vehicle computing system 102 can maintain braking control of the vehicle 10 via the other control lane, therefore the redundancy threshold condition is satisfied at a time before an occurrence of the fault. However, if a fault does occur with respect to braking control system(s) 224 via the first control lane, and the vehicle control system 122 switches braking control to the second control lane, then the redundancy threshold condition is not satisfied at a time after the fault occurs because the vehicle control system 122 would not be able to control the braking operation of the vehicle 10 in the event of another fault with respect to braking control system(s) 224, and the vehicle control system 122 can determine that the fault is a critical fault.

Figure 2:
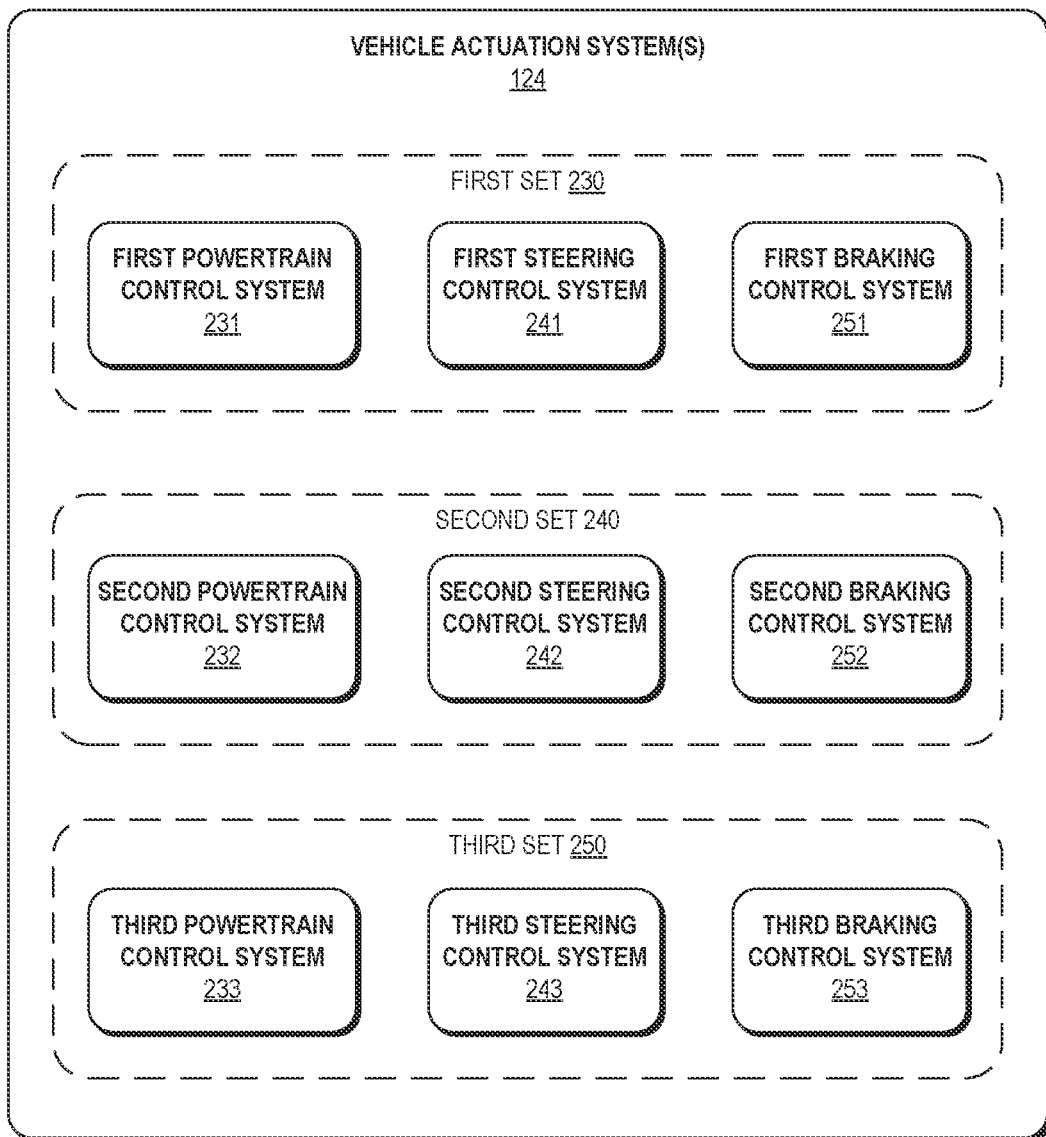
FIG. 2 depicts example vehicle actuation systems according to example embodiments of the present disclosure.

FIG. 2 depicts an example of a vehicle actuation system(s) 124 according to example embodiments of the present disclosure. As shown in FIG. 2, the vehicle actuation system(s) 124 can include a plurality of powertrain control system(s) 220 (e.g., first powertrain control system 231, second powertrain control system 232, and third powertrain control system 233), a plurality of steering control systems 222 (e.g., first steering control system 241, second steering control system 242, and third steering control system 243), and a plurality of braking control system(s) 224 (e.g., first braking control system 251, second braking control system 252, and third braking control system 253). The first powertrain control system 231, first steering control system 241, and first braking control system 251 can be arranged in a first set 230 of vehicle component(s) 124 that are connected to a first control lane of the vehicle control system 122. The second powertrain control system 232, second steering control system 242, and second braking control system 252 can be arranged in a second set 240 of vehicle component(s) 124 that are connected to a second control lane of the vehicle control system 122. The third powertrain control system 233, third steering control system 243, and third braking control system 253 can be arranged in a third set 250 of vehicle component(s) 124 that are connected to a third control lane of the vehicle control system 122.

Figure 3:
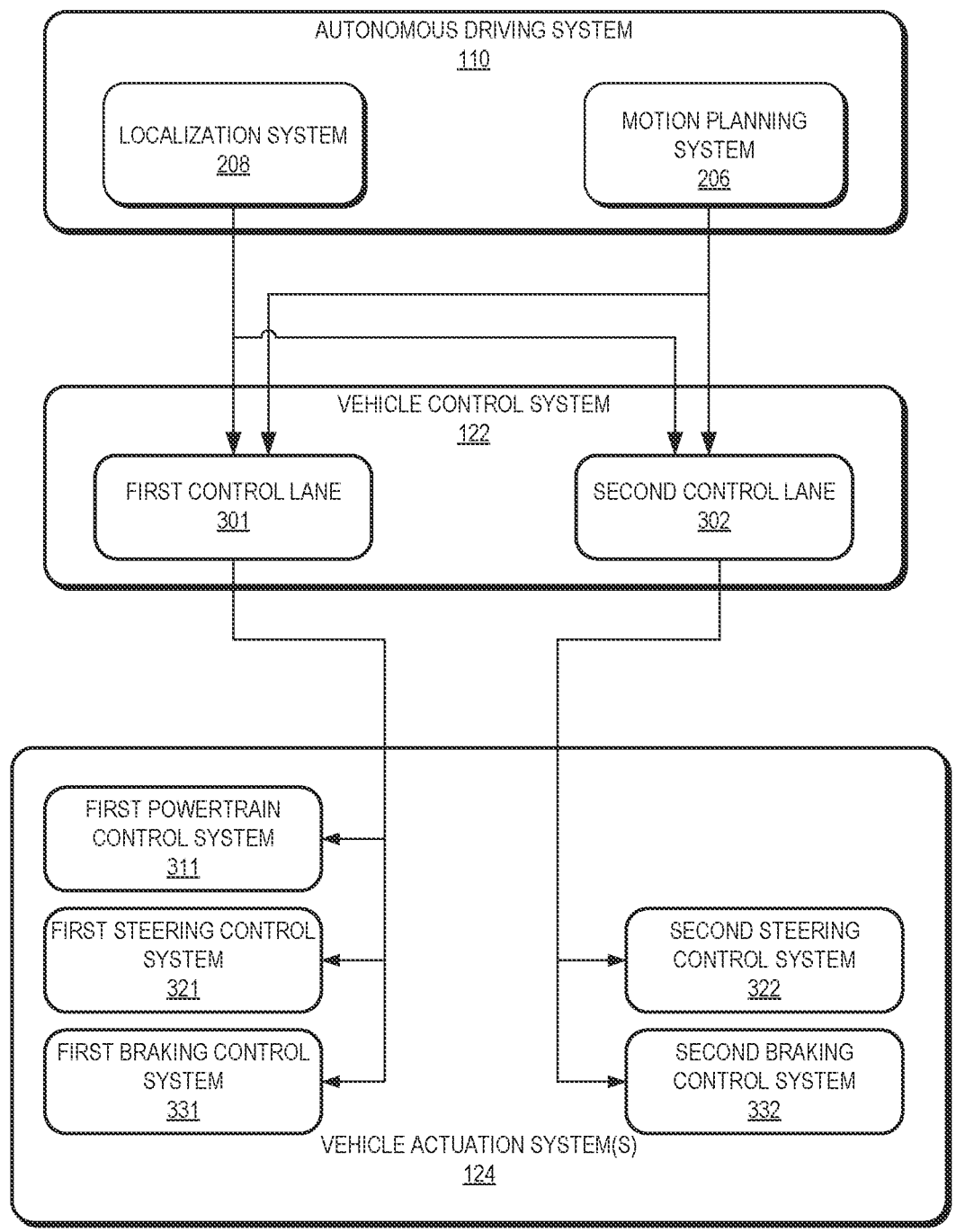
FIG. 3 depicts an example dual-lane control architecture according to example embodiments of the present disclosure.

FIG. 3 depicts a diagram 300 of vehicle control system 122 with a dual-lane control architecture. As shown in FIG. 3, the vehicle control system 122 can include a first control lane 301 and a second control lane 302. The first control lane 301 is connected with a first set of vehicle actuation system(s) 124, including a first powertrain control system 311, a first steering control system 321, and a first braking control system 331; and the second control lane 302 is connected with a second set of vehicle actuation system(s) 124, including a second steering control system 322, and a second braking control system 332. The first powertrain control system 311 can include a first propulsion actuator for controlling a propulsion/acceleration of vehicle 10; the first steering control system 321 and the second steering control system 322 can include a first and second steering actuator, respectively, that function independently of each other, for controlling vehicle 10; and the first braking control system 331 and the second braking control system 332 can include a first and second braking actuator, respectively, that function independently of each other, for controlling vehicle 10.

According to an aspect of the present disclosure, the vehicle computing system 102 can control the autonomous driving system 110 to provide data representing a motion plan and data representing a dynamic state of the autonomous vehicle to the first control lane 301 and the second control lane 302 simultaneously.

According to an aspect of the present disclosure, the vehicle control system 122 can designate one of the first control lane 301 or the second control lane 302 as a primary lane, and the other as a secondary lane (e.g., based on a capability of the first control lane 301 and a capability of the second control lane 302). Vehicle control system 122 can use the primary lane to control vehicle 10 so that both the first control lane 301 and the second control lane 302 are not simultaneously attempting to control the same operation of the vehicle 10.

For example, the vehicle control system 122 can determine that first control lane 301 has a greater capability than second control lane 302 because the first control lane 301 has a capability of propulsion control via the first powertrain control system 311 and the second control lane 302 does not have a capability of propulsion control. Vehicle control system 122 can designate first control lane 301 as the primary lane and second control lane 302 as the secondary lane. The vehicle control system 122 can control first control lane 301 to implement a motion plan from the autonomous driving system 110 (using the first powertrain control system 311, first steering control system 321, and first braking control system 331) and silence the second control lane 302 (e.g., control the second control lane 302 to assume a "fail silent" mode). By designating the first control lane 301 as the primary lane, vehicle 10 can be controlled when the motion plan is implemented by the first control lane 301, but not when the motion plan is implemented by the second control lane 302.

Figure 4:
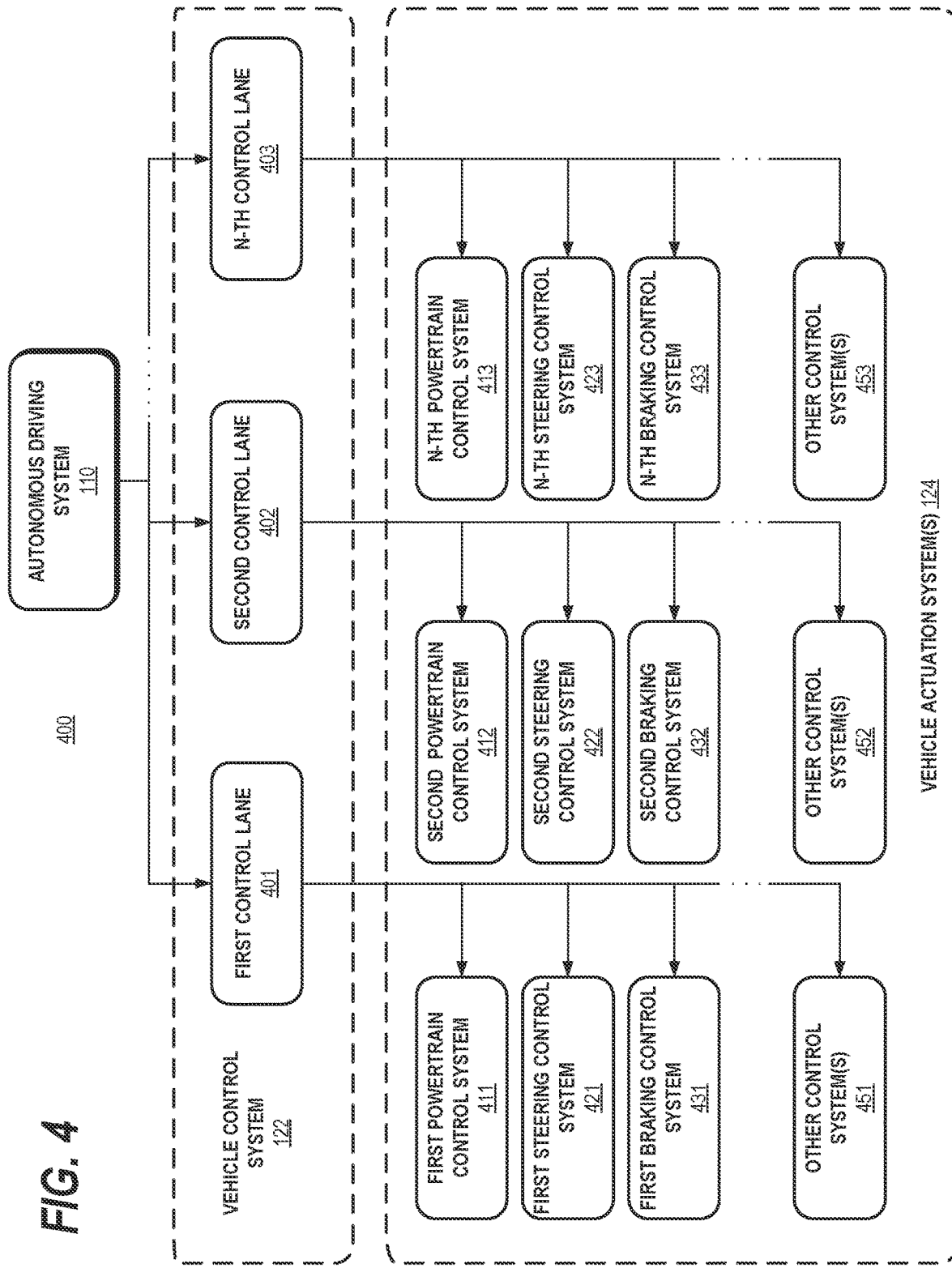
FIG. 4 depicts an example multi-lane control architecture according to example embodiments of the present disclosure.

FIG. 4 depicts a diagram 400 of the vehicle control system 122 with a multi-lane control architecture. As shown in FIG. 4, the vehicle control system 122 can include a first control lane 401, a second control lane 402, up to a n-th control lane 403.

The first control lane 401 is connected with a first set of vehicle actuation system(s) 124 (e.g., a first powertrain control system 411, a first steering control system 421, a first braking control system 431, and one or more other control system(s) 451); the second control lane 402 is connected with a second set of vehicle actuation system(s) 124 (e.g., a second powertrain control system 412, a second steering control system 422, a second braking control system 432, and one or more other control system(s) 452); and the n-th control lane is connected with a n-th set of vehicle control(s) systems 124 (e.g., a n-th powertrain control system 413, a n-th steering control system 423, a n-th braking control system 443, and one or more other control system(s) 453).

Each powertrain control system (411, 412, . . . , 413) can include a respective propulsion actuator that functions independently, for controlling vehicle 10; each steering control system (421, 422, . . . , 423) can include a respective steering actuator that functions independently, for controlling vehicle 10; each braking control system (431, 432, . . . , 433) can include a respective braking actuator that functions independently, for controlling vehicle 10; and each of the one or more other control system(s) (451, 452, . . . , 453) can include a respective actuator that functions independently, for controlling vehicle 10.

According to an aspect of the present disclosure, the autonomous driving system 110 can provide a motion plan to each of the control lanes (401, 402, . . . , 403) simultaneously. The vehicle control system 122 can designate one of the control lanes (401, 402, . . . , 403) as a primary lane, and the remaining control lanes as secondary lanes. Vehicle control system 122 can control the primary lane to implement the motion plan and control vehicle 10, and silence the secondary lanes. By designating first control lane 401 as the primary lane, vehicle 10 can be controlled when the motion plan is implemented via the first control lane 401, but not when the motion plan is implemented via the remaining control lanes (402, . . . , 403).

Figure 5:
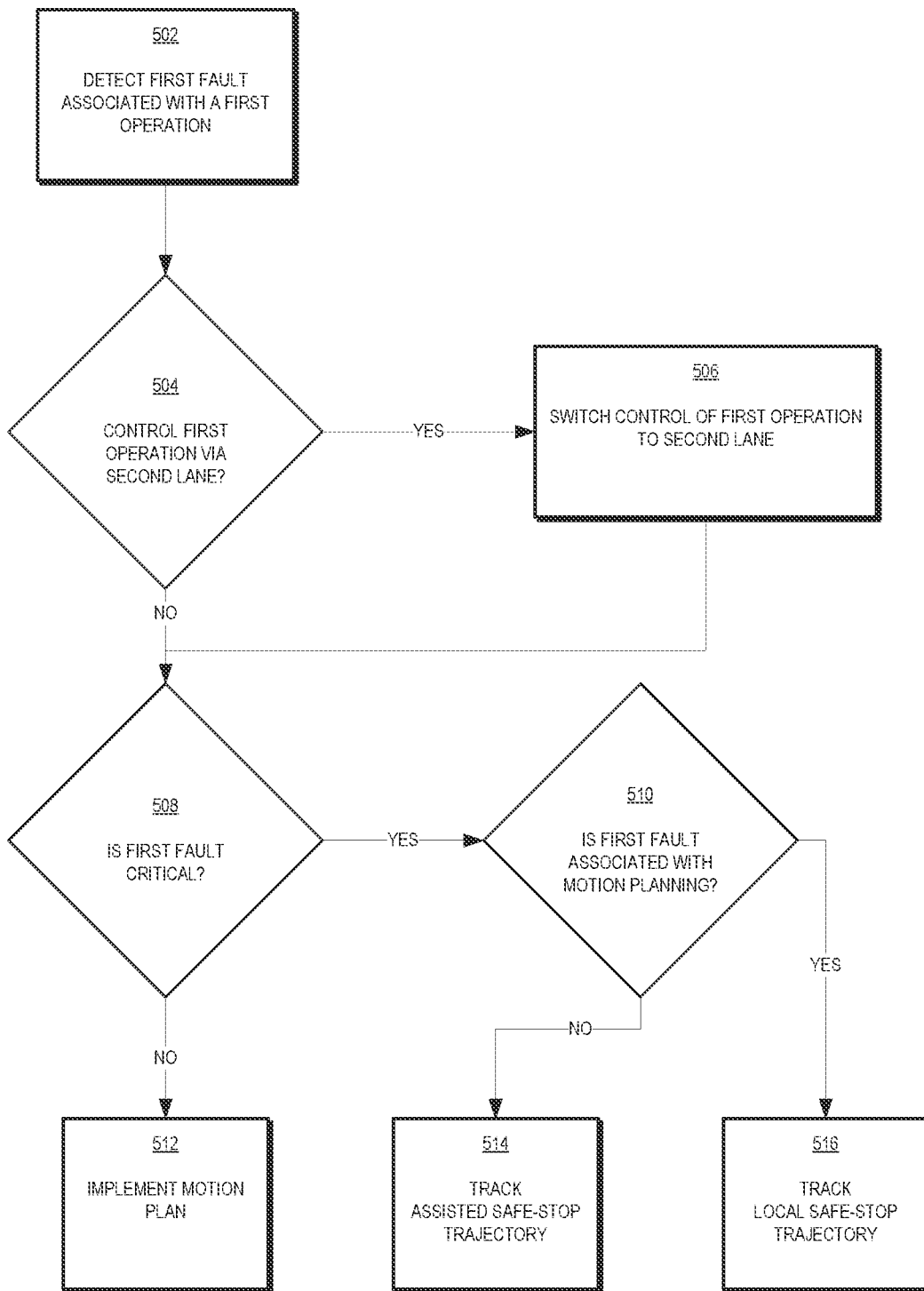
FIG. 5 depicts a flow diagram of a first aspect of controlling an autonomous vehicle according to example embodiments of the present disclosure.
Figure 6:
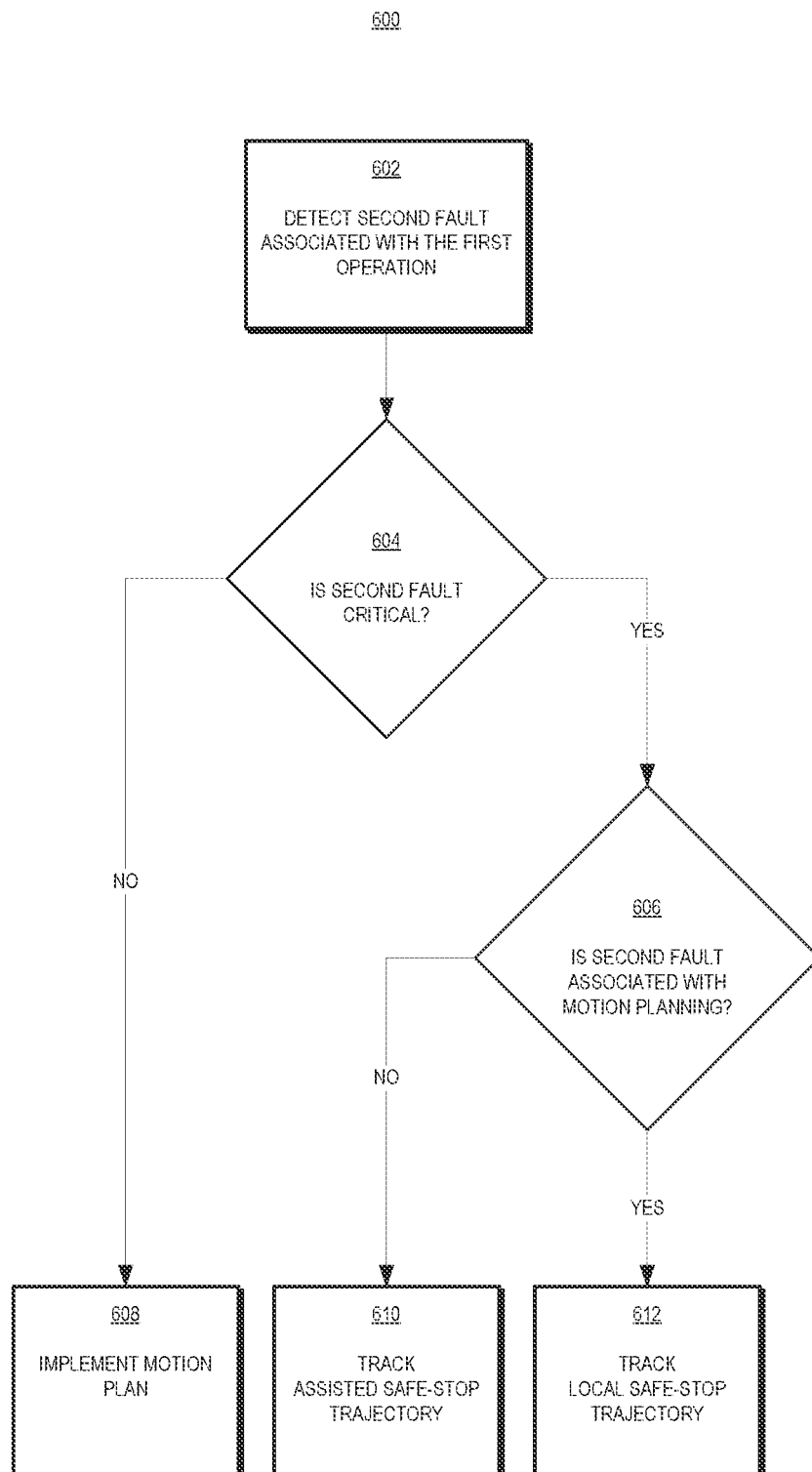
FIG. 6 depicts a flow diagram of a second aspect of controlling an autonomous vehicle according to example embodiments of the present disclosure.
Figure 7:
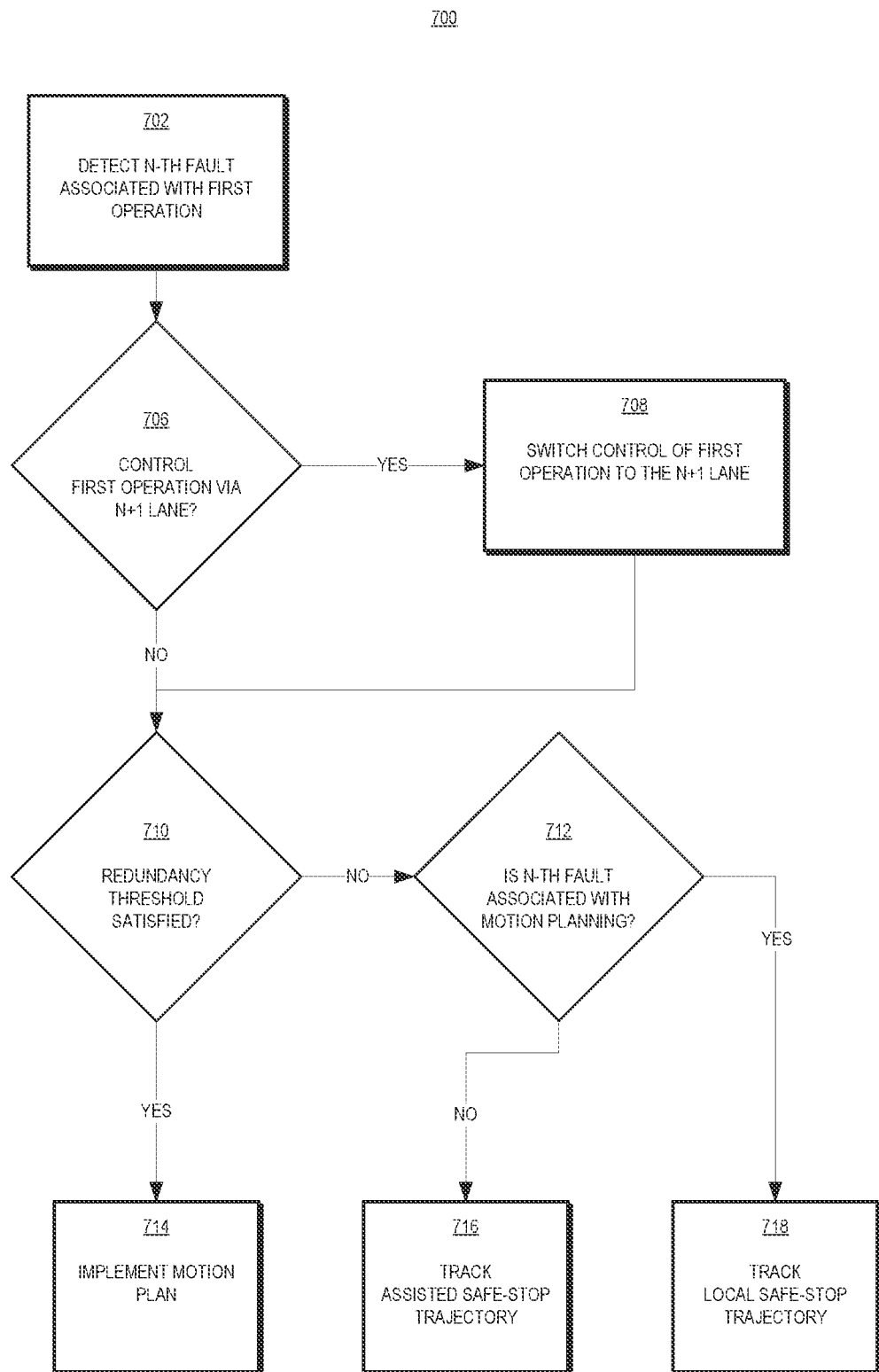
FIG. 7 depicts a flow diagram of a third aspect of controlling an autonomous vehicle according to example embodiments of the present disclosure.

FIGS. 5, 6, and 7 depict flow diagrams of example methods 500, 600, and 700 associated with various aspects for controlling an autonomous vehicle according to example embodiments of the present disclosure. One or more portion(s) of the methods 500, 600, and 700 can be implemented as operations by one or more computing system(s) such as, for example, the computing system 102 or computing device(s) 104 shown in FIG. 1. Moreover, one or more portion(s) of the methods 500, 600, and 700 can be implemented as an algorithm on the hardware components of the system(s) described herein (e.g., as in FIG. 1) to, for example, detect and respond to a fault causing a loss of control over one or more component(s) of the vehicle 10.

FIGS. 5, 6, and 7 depict a first, second, and n-th fault that are associated with an operation of the vehicle 10. Those of ordinary skill in the art, using the disclosures provided herein, will understand that a fault can cause a loss of control over one or more operations of the vehicle 10, and the methods 500, 600, and 700 can be iterated for each such operation associated with the fault. Additionally, those of ordinary skill in the art will understand that a fault can be associated with one or more control lanes, and methods 500, 600, and 700 can be iterated for each such control lane.

FIG. 5 depicts a diagram of a method 500 for controlling the vehicle 10 when a first fault that affects an operation of the vehicle 10 is detected. At (502), the method 500 can include detecting a first fault (e.g., a fault associated with receiving the data representing the motion plan, a fault associated with one or more of the plurality of control lanes, or a fault associated with one or more vehicle actuation systems associated with the one or more of the plurality of control lanes, etc.). For example, the first fault can cause the vehicle control system 122 to lose control over a first operation of the vehicle 10: via the first control lane 301 when the first control lane 301 is designated as the primary lane; via the first control lane 301 when the first control lane 301 is designated as a secondary lane; via the second control lane 302 when the second control lane 301 is designated as a secondary lane; or via the second control lane 302 when the second control lane 302 is designated as the primary lane.

At (504), the method 500 can include determining whether the first operation can be controlled via a second lane. For example, if the vehicle control system 122 loses steering control because of a fault with the first steering control system 321 connected to the first control lane 301 (first lane), then the vehicle control system 122 can determine whether the steering of the vehicle 10 can be controlled by the second steering control system 322 connected to the second control lane 302 (second lane).

As another example, if the vehicle control system 122 loses steering control because of a fault with the second steering control system 322 connected to the second control lane 302 (first lane), then the vehicle control system 122 can determine whether the steering of the vehicle 10 can be controlled by the first steering control system 321 on the first control lane 301 (second lane).

At (506), if the method 500 determines at (504) that the first operation can be controlled via a second lane, the method 500 can include switching control of the first operation to the second lane. For example, if the vehicle control system 122 loses steering control because of a fault with the first steering control system 321 connected to the first control lane 301 (first lane) when the first control lane 301 is designated as the primary lane, then the vehicle control system 122 can switch steering control of the vehicle 10 to the second steering control system 322 connected to the second control lane 302 (second lane) by designating the second control lane 302 as the primary lane for controlling the steering of the vehicle 10.

As another example, if the vehicle control system 122 loses steering control because of a fault with the second steering control system 322 connected to the second control lane 302 (first lane) when the first control lane 301 (second lane) is designated as the primary lane for controlling the steering of the vehicle 10, then the vehicle control system 122 can determine to take no action because the steering is being controlled by the first control lane 301 (second lane).

At (508), if the method 500 determines at (504) that the first operation cannot be controlled via a second lane, or after the method 500 switches control of the first operation to the second lane at (506), the method 500 can include determining if the first fault is critical. For example, the vehicle control system 122 can access the fault reaction parameters data to determine if the first fault is a critical fault. A critical fault can include a fault that causes a loss of control over a critical system onboard the vehicle 10 (e.g., autonomous driving system 110, vehicle control system 122, vehicle actuation system(s) 124, etc.) or a fault that causes a loss of redundancy with respect to a critical system onboard the vehicle 10 such that the vehicle 10 is no longer robust to a single point of failure.

At (510), if the method 500 determines at (508) that the first fault is a critical fault, then method 500 can include determining if the first fault is associated with the autonomous driving system 110 (e.g., a fault associated with receiving the data representing the motion plan).

At (512), if the method 500 determines at (508) that the first fault is not a critical fault, then method 500 can include implementing a motion plan. For example, if the first fault causes the vehicle control system 122 to lose control of a stereo control system, and determines that the first fault is not a critical fault, then the vehicle control system 122 can implement the motion plan (to complete a vehicle service) without controlling the first operation.

At (514), if the method 500 determines at (508) that the first fault is a critical fault, but that the first fault is not associated with generating a motion plan by the autonomous driving system 110 or receiving data representing the motion plan by the vehicle control system 122, then method 500 can include receiving a new motion plan associated with an assisted safe-stop action, and tracking an assisted safe-stop trajectory in the new motion plan. For example, the vehicle control system 122 can request the autonomous driving system 110 to provide a new motion plan for safely stopping the autonomous vehicle (e.g., assisted safe-stop action) and the vehicle control system 122 can implement the new motion plan by tracking an assisted safe-stop trajectory in the new motion plan. In addition to receiving data representing the new motion plan from the autonomous driving system 110, the vehicle control system 122 can receive data representing a dynamic state of the vehicle 10 from the autonomous driving system 110 (e.g., via the localization system 208). The vehicle control system 122 can track the assisted safe-stop trajectory based on the received data representing the dynamic state of the vehicle 10. Alternatively, if the first fault is associated with the localization system 208, then the vehicle control system 122 can determine a dynamic state of the vehicle 10 based on an IMU and/or one or more redundant local sensors 109 associated with the vehicle control system 122, and the vehicle control system 122 can track the assisted safe-stop trajectory based on the determined dynamic state.

At (516), if the method 500 determines at (508) that the first fault is a critical fault, and that the first fault is associated with motion planning, then method 500 can include tracking a local safe-stop trajectory. For example, if the vehicle control system 122 determines that the first fault is a critical fault because the first fault is associated with receiving data representing a motion plan from the autonomous driving system 110, then the vehicle control system 122 can retrieve a locally stored safe-stop trajectory previously received from the autonomous driving system 110 and track the local safe-stop trajectory. If the vehicle control system 122 continues to receive valid data representing a dynamic state of the vehicle 10 from the autonomous driving system 110 (e.g., via the localization system 208), then the vehicle control system 122 can track the local safe-stop trajectory based on the received data representing the dynamic state of the vehicle 10. Alternatively, the vehicle control system 122 can determine a dynamic state of the vehicle 10 based on an IMU and/or one or more redundant local sensors 109 associated with the vehicle control system 122, and the vehicle control system 122 can track the local safe-stop trajectory based on the determined dynamic state.

FIG. 6 depicts a diagram of a method 600 for controlling the vehicle 10 with a dual-lane control architecture, when a second fault that affects a first operation is detected.

At (602), the vehicle control system 122 can include detecting a second fault associated with a first operation of the vehicle 10 (e.g., a fault associated with receiving the data representing the motion plan, a fault associated with one or more of the plurality of control lanes, or a fault associated with one or more vehicle actuation systems associated with the one or more of the plurality of control lanes, etc.). The second fault can occur subsequent to a first fault associated with the first operation. For example, the vehicle computing system can detect the first fault that causes the vehicle control system 122 to lose control of a stereo control system connected to the first lane, and then detect the second fault that causes the vehicle control system 122 to lose control of a stereo control system connected to the second lane.

At (604), the method 600 can include determining whether the second fault is critical. For example, the vehicle control system 122 can access the fault reaction parameters data to determine if the second fault is a critical fault.

At (606), if the method 600 determines at (604) that the second fault is a critical fault, then method 600 can include determining if the second fault is associated with motion planning (e.g., generating a motion plan by the autonomous driving system 110 or receiving data representing the motion plan by the vehicle control system 122).

At (608), if the method 600 determines at (604) that the second fault is not a critical fault, the method 600 can include implementing a motion plan. For example, if the second fault causes the vehicle control system 122 to lose control of a stereo control system connected to the second lane, and the vehicle control system 122 determines that the second fault is not a critical fault, then the vehicle control system 122 can implement the motion plan (to complete a vehicle service) without controlling the stereo.

At (610), if the method 600 determines at (604) that the second fault is a critical fault, but determines at (606) that the second fault is not associated with motion planning, then method 600 can include receiving a new motion plan for an assisted safe-stop action, and tracking an assisted safe-stop trajectory in the new motion plan.

At (612), if the method 600 determines at (604) that the second fault is a critical fault, and at (606) that the second fault is associated with the autonomous driving system 110, then method 600 can include tracking a local safe-stop trajectory. For example, if the vehicle control system 122 determines that the second fault is a critical fault because the second fault is associated with receiving data representing a motion plan from the autonomous driving system 110, then the vehicle control system 122 can retrieve a locally stored safe-stop trajectory previously received from the autonomous driving system 110 and track the local safe-stop trajectory.

FIG. 7 depicts a diagram of a method 700 for controlling the vehicle 10 with a multi-lane control architecture with n or more control lanes, when a n-th fault that affects a first operation is detected. The vehicle control system 122 can detect n−1 faults that are associated with the first operation, and then detect the n-th fault that is associated with the first operation.

At (702), the vehicle control system 122 can include detecting a n-th fault (e.g., a fault associated with receiving the data representing the motion plan, a fault associated with one or more of the plurality of control lanes, or a fault associated with one or more vehicle actuation systems associated with the one or more of the plurality of control lanes, etc.).

At (706), the method 700 can include determining whether the first operation can be controlled via a n+1 control lane. For example, the vehicle control system 122 can determine if the vehicle 10 includes a multi-lane control architecture with n+1 control lanes, and if so the vehicle control system 122 can determine if the first operation can be controlled via a n+1 control lane. The n+1 control lane can be organized in a hierarchy of decreasing capability such that control lane n+1 has a capability less than or equal to control lane n.

As another example, if the vehicle control system 122 determines that the vehicle 10 does not include a multi-lane control architecture with n+1 control lanes, or that the n-th fault is associated with the autonomous driving system 110, then the vehicle control system 122 can determine that the first operation cannot be controlled via a n+1 control lane.

At (708), if the method 700 determines at (706) that the first operation can be controlled via a n+1 control lane, the method 700 can include switching control of the first operation to the n+1 control lane. For example, if n-th fault causes the vehicle control system 122 to lose steering control of the vehicle 10, then the vehicle control system 122 can switch steering control of the vehicle 10 to the n+1 control lane by designating the n+1 control lane as the primary lane for controlling the steering.

At (710), if the method 700 determines at (706) that the first operation cannot be controlled via a n+1 control lane, or after the method 700 switches control of the first operation to the n+1 control lane at (708), the method 700 can include determining whether a redundancy threshold condition for the first operation is satisfied. For example, the vehicle control system 122 can access the fault reaction parameters data to determine a redundancy threshold value for the first operation, and determine if the n-th fault is a critical fault.

At (712), if the method 700 determines at (710) that the redundancy threshold condition for the first operation is not satisfied, the method 700 can include determining if the first fault is associated with motion planning (e.g., generating a motion plan by the autonomous driving system 110 or receiving data representing the motion plan by the vehicle control system 122).

At (714), if the method 700 determines at (710) that the redundancy threshold condition is satisfied, the method 700 can include implementing a motion plan. For example, if the n-th fault causes the vehicle control system 122 to lose control of a stereo control system connected to a n-th control lane, and the vehicle control system 122 determines that a redundancy threshold value for stereo control is −1, then the vehicle control system 122 can implement the motion plan (to complete a vehicle service) without controlling the stereo.

At (716), if the method 700 determines at (710) that the redundancy threshold condition is not satisfied and the n-th fault is a critical fault, and at (712) that the first fault is not associated with the autonomous driving system 110, then method 700 can include receiving a new motion plan associated with an assisted safe-stop action, and tracking an assisted safe-stop trajectory in the new motion plan.

At (718), if the method 700 determines at (710) that the redundancy threshold condition is not satisfied and the n-th fault is a critical fault, and at (712) that the first fault is associated with the autonomous driving system 110, then the vehicle control system 122 can retrieve a locally stored safe-stop trajectory previously received from the autonomous driving system 110 and track the local safe-stop trajectory.

Figure 8:
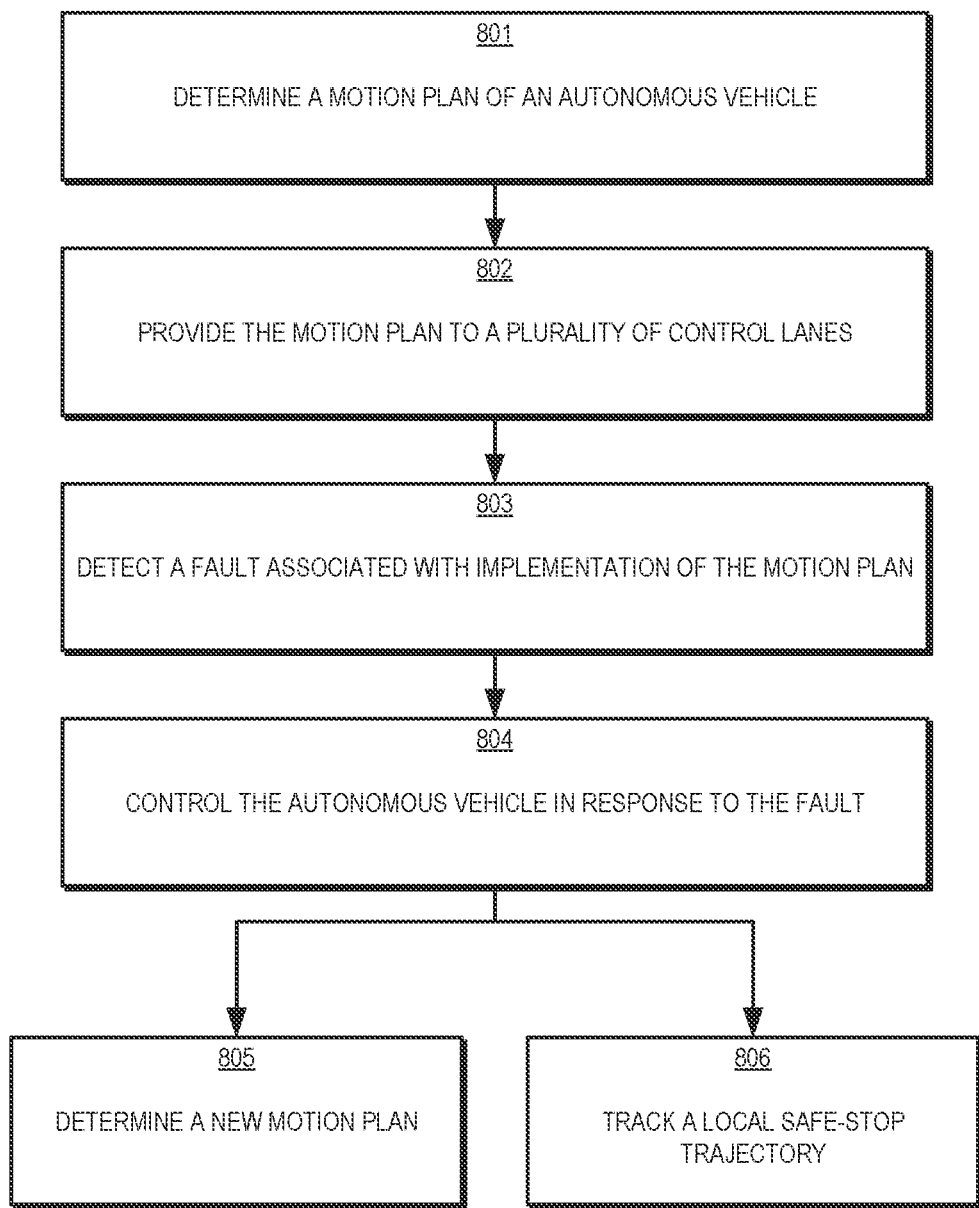
FIG. 8 depicts a flow diagram of a fourth aspect of controlling an autonomous vehicle according to example embodiments of the present disclosure.

FIG. 8 depicts elements performed in a particular order for purposes of illustration and discussion. Those of ordinary skill in the art, using the disclosures provided herein, will understand that the elements FIG. 8 discussed herein can be adapted, rearranged, expanded, omitted, combined, and/or modified in various ways without deviating from the scope of the present disclosure.

At (801), the method 800 can include determining a motion plan of an autonomous vehicle. For example, the autonomous driving system 110 onboard the vehicle 10 can determine a motion plan for controlling a motion of the vehicle 10, based on sensor data 250 from sensor(s) 108. The motion plan can include one or more primary trajectories and a safe-stop trajectory associated with each primary trajectory. In some implementations, the autonomous driving system 110 can also determine a dynamic state of the autonomous vehicle.

At (802), the method 800 can include providing the motion plan to a plurality of control lanes. For example, the autonomous driving system 110 can provide data representing the motion plan to a plurality of control lanes of the vehicle control system 122. In some implementations, the autonomous driving system 110 can provide data representing the dynamic state of the autonomous vehicle to the plurality of control lanes of the vehicle control system 122. The plurality of control lanes can be configured to implement the motion plan to control the motion of the vehicle 10. The plurality of control lanes can include at least a first control lane and a second control lane. The vehicle control system 122 can control the first control lane to implement the motion plan (e.g., designate the first control lane as a primary lane, and designate the second control lane as a secondary lane). In some implementations, the vehicle control system 122 can control the first control lane to implement the motion plan by determining a primary trajectory based on the data representing the motion plan, controlling the first control lane to generate one or more first vehicle control signals to track the primary trajectory, and provide the one or more first vehicle control signals to one or more first vehicle actuation systems 124 connected to the first control lane. In some implementations, the vehicle control system 122 can control the first control lane and the second control lane to implement the motion plan. The vehicle control system 122 can control the first control lane to generate one or more first vehicle control signals to track the primary trajectory, and provide the one or more first vehicle control signals to one or more first vehicle actuation systems 124 connected to the first control lane; and control the second control lane to generate one or more second vehicle control signals to track the primary trajectory, and provide the one or more second vehicle control signals to one or more second vehicle actuation systems 124 connected to the second control lane.

At (803), the method 800 can include detecting a first fault associated with implementation of the motion plan. For example, the vehicle control system 122 can detect one or more faults associated with implementation of the motion plan by the first control lane or the second control lane. In some implementations, the vehicle control system 122 can detect one or more faults associated with implementation of the motion plan by one or more of the plurality of control lanes. The one or more faults can include, for example, at least one of a fault associated with receiving the data representing the motion plan, a fault associated with one or more of the plurality of control lanes, or a fault associated with one or more vehicle actuation systems 124 associated with the one or more of the plurality of control lanes.

At (804), the method 800 can include controlling the autonomous vehicle in response to the fault. For example, in response to the one or more faults, the vehicle control system 122 can control the first control lane or the second control lane to adjust the motion of the vehicle 10 based at least in part on one or more fault reaction parameters associated with the one or more faults. In some implementations, the one or more fault reaction parameters can indicate a capability of the one or more control lanes in response to the one or more faults. Controlling the vehicle 10 in response to the fault can include determining a new motion plan or tracking a local safe-stop trajectory.

In some implementations, the vehicle control system 122 can determine a capability of the first control lane based on the one or more fault reaction parameters associated with the one or more faults, and control the first control lane to adjust the motion of the vehicle 10 based at least in part on the capability of the first control lane.

In some implementations, the vehicle control system 122 can determine a capability of the first control lane and the second control lane based on the one or more fault reaction parameters associated with the one or more faults, and control the first control lane and the second control lane to adjust the motion of the vehicle 10 based at least in part on the capability of the first control lane and the second control lane.

In some implementations, the vehicle control system 122 can determine a capability of the first control lane and the second control lane based on the one or more fault reaction parameters associated with the one or more faults, and control the second control lane to adjust the motion of the vehicle 10 based at least in part on the capability of the second control lane and the second control lane.

In some implementations, the vehicle control system 122 can determine a capability of the plurality of control lanes in response to the one or more faults, determine the second control lane as a control lane with the highest capability from the plurality of control lanes, and control the second control lane to adjust the motion of the vehicle 10 based at least in part on one or more fault reaction parameters associated with the one or more faults.

At (805), the method 800 can include determining a new motion plan. For example, the vehicle control system 122 can provide one or more control signals to the autonomous driving system 110 that instruct the autonomous driving system 110 to determine a stopping action based on the one or more fault reaction parameters associated with the one or more faults. In response to providing the one or more control signals to the autonomous driving system 110, the vehicle control system 122 can receive data representing a motion plan from the autonomous driving system 110. The data representing the new motion plan can correspond to the stopping action, and the vehicle control system 122 can control the first control lane or the second control lane to implement the new motion plan corresponding to the stopping action.

At (806), the method 800 can include tracking a local safe-stop trajectory. For example, the vehicle control system 122 can retrieve a locally stored safe-stop trajectory that was previously received in the data representing the motion plan. The vehicle control system 122 can control the first control lane to generate one or more vehicle control signals to track the local safe-stop trajectory, and to provide the one or more vehicle control signals to one or more vehicle actuation systems 124 connected to the first control lane.

In some implementations, the vehicle control system 122 can control the first control lane to determine a dynamic state of the vehicle 10. In particular, the dynamic state of the vehicle 10 can be determined by an inertial measurement unit (IMU) and/or additional sensors associated with the first control lane. The vehicle control system 122 can control the first control lane to adjust the local safe-stop trajectory based on the dynamic state of the vehicle 10.

In some implementations, the vehicle control system 122 can receive data representing a potential collision with one or more objects in an environment proximate to the vehicle 10. The vehicle control system 122 can receive the data from the collision mitigation system 126 onboard the vehicle 10. The vehicle control system 122 can control the first control lane to adjust the local safe-stop trajectory based on the data representing the potential collision (e.g., to avoid the potential collision).

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle control system comprising:
   one or more processors; and
   one or more tangible, non-transitory, computer readable media that store instructions that when executed by the one or more processors cause the autonomous vehicle control system to perform operations, the operations comprising:
   receiving motion planning data for a vehicle;
   determining a first control lane of a plurality of control lanes for implementing a motion plan based on the motion planning data, wherein the plurality of control lanes comprise at least the first control lane and a second control lane different than the first control lane, wherein the first control lane is connected with a first set of vehicle actuation systems corresponding to the first control lane, wherein the second control lane is connected with a second set of vehicle actuation systems corresponding to the second control lane, wherein the first set of vehicle actuation systems comprise at least one first actuation system that is not present in the second set of vehicle actuation systems;

determining one or more conditions associated with the vehicle; and controlling the first control lane or the second control lane to adjust a motion of the vehicle based at least in part on the one or more conditions.

2. The autonomous vehicle control system of claim 1, wherein the vehicle comprises a ground-based autonomous vehicle.

3. The autonomous vehicle control system of claim 2, wherein the ground-based autonomous vehicle comprises an autonomous truck.

4. The autonomous vehicle control system of claim 1, wherein the motion planning data is indicative of a vehicle trajectory, and wherein controlling the first control lane or the second control lane to adjust the motion of the vehicle comprises:

controlling the first control lane or the second control lane to:
generate one or more vehicle control signals to track the vehicle trajectory; and
provide the one or more vehicle control signals to at least one of the first set of vehicle actuation systems or at least one of the second set of vehicle actuation systems.

5. The autonomous vehicle control system of claim 1, wherein the motion planning data is indicative of a vehicle trajectory, and wherein controlling the first control lane or the second control lane to adjust the motion of the vehicle comprises:

controlling the first control lane to:
generate one or more first vehicle control signals to track at least a first portion of the vehicle trajectory; and
provide the one or more first vehicle control signals to at least one of the first set of vehicle actuation systems; and controlling the second control lane to:
generate one or more second vehicle control signals to track at least a second portion of the vehicle trajectory; and
provide the one or more second vehicle control signals to at least one of the second set of vehicle actuation systems.

6. The autonomous vehicle control system of claim 1, wherein the first set of vehicle actuation systems comprise:

a first powertrain control system comprising one or more propulsion actuators for a propulsion or an acceleration of the vehicle;

a first steering control system comprising one or more steering actuators for the vehicle; and a first braking control system comprising one or more braking actuators for the vehicle.

7. The autonomous vehicle control system of claim 6, wherein the second set of vehicle actuation systems comprise:

a second steering control system comprising one or more steering actuators for the vehicle; and a second braking control system comprising one or more braking actuators for the vehicle.

8. The autonomous vehicle control system of claim 7, wherein the first steering actuators function independently of the second steering actuators, and wherein the first braking actuators function independently of the second braking actuators.

9. The autonomous vehicle control system of claim 1, wherein the first control lane is associated with a first capability based, at least in part, on the first set of vehicle actuation systems, wherein the second control lane is associated with a second capability based, at least in part, on the second set of vehicle actuation systems, and wherein the first capability is different than the second capability.

10. The autonomous vehicle control system of claim 9, wherein the one or more conditions are associated with one or more reaction parameters, and wherein controlling the first control lane or the second control lane to adjust the motion of the vehicle based at least in part on the one or more conditions comprises:

controlling the first control lane or the second control lane to adjust the motion of the vehicle based at least in part on the one or more reaction parameters associated with the one or more conditions, wherein the one or more reaction parameters are indicative of a first reduction in the first capability or a second reduction in the second capability in response to the one or more conditions.

11. The autonomous vehicle control system of claim 1, wherein the autonomous vehicle control system is on-board the vehicle.

12. An autonomous vehicle comprising:

a plurality of actuators configured to implement one or more vehicle control signals to control a motion of the autonomous vehicle; and a vehicle control system, wherein the vehicle control system comprises:

one or more processors; and one or more tangible, non-transitory, computer readable media that store instructions that when executed by the one or more processors cause the vehicle control system to perform operations, the operations comprising:

receiving motion planning data for the autonomous vehicle;

determining a first control lane of a plurality of control lanes for implementing a motion plan based on the motion planning data, wherein the plurality of control lanes comprise at least the first control lane and a second control lane different than the first control lane, wherein the first control lane is connected with a first set of the plurality of actuators corresponding to the first control lane, wherein the second control lane is connected with a second set of the plurality of actuators corresponding to the second control lane, wherein the first set of actuators comprise at least one first actuator ion system that is not present in the second set of actuators;

determining one or more conditions associated with the autonomous vehicle; and controlling the first control lane or the second control lane to adjust the motion of the autonomous vehicle based at least in part on the one or more conditions.

13. The autonomous vehicle of claim 12, wherein the autonomous vehicle comprises an autonomous truck.

14. The autonomous vehicle of claim 12, further comprising:
an autonomous driving system configured to generate at least a first portion of the motion planning data for the autonomous vehicle and provide the first portion of the motion planning data to the vehicle control system.

15. The autonomous vehicle of claim 14, wherein the first portion of the motion planning data is indicative of one or more primary trajectories and one or more stopping trajectories.

16. The autonomous vehicle of claim 15, further comprising:
a computing system configured to generate at least a second portion of the motion planning data for the autonomous vehicle and provide the second portion of the motion planning data to the vehicle control system.

17. The autonomous vehicle of claim 16, wherein the autonomous driving system is associated with a first set of vehicle sensors and the computing system is associated with a second set of vehicle sensors, wherein the first set of vehicle sensors is different than the second set of vehicle sensors.

18. The autonomous vehicle of claim 16, wherein the second portion of the motion planning data is indicative of one or more objects within a surrounding environment of the autonomous vehicle.

19. The autonomous vehicle of claim 16, wherein controlling the first control lane or the second control lane to adjust the motion of the autonomous vehicle based at least in part on the one or more conditions comprises:
determining a vehicle action based at least in part on the first portion of the motion planning data, the second portion of the motion planning data, and the one or more conditions; and
controlling the first control lane or the second control lane to adjust the motion of the autonomous vehicle based at least in part on the vehicle action.

20. A computer-implemented method, the method comprising:
receiving motion planning data for an autonomous vehicle;
determining a first control lane of a plurality of control lanes for implementing a motion plan based on the motion planning data,
wherein the plurality of control lanes comprise at least the first control lane and a second control lane different than the first control lane, wherein the first control lane is connected with a first set of vehicle actuation systems corresponding to the first control lane, wherein the second control lane is connected with a second set of vehicle actuation systems corresponding to the second control lane, wherein the first set of vehicle actuation systems comprise at least one first actuation system that is not present in the second set of vehicle actuation systems;
determining one or more conditions associated with the autonomous vehicle; and
controlling the first control lane or the second control lane to adjust a motion of the autonomous vehicle based at least in part on the one or more conditions.

* * * * *